United States Patent [19]

Kistner

[11] Patent Number: 4,497,861
[45] Date of Patent: Feb. 5, 1985

[54] WATER-REPELLENT, ABRASION RESISTANT COATINGS

[75] Inventor: John F. Kistner, Oakdale, Minn.

[73] Assignee: Minnesota Mining and Manufacturing Company, St. Paul, Minn.

[21] Appl. No.: 496,572

[22] Filed: May 20, 1983

[51] Int. Cl.³ .......................... B32B 3/00; B32B 9/04; B32B 27/38
[52] U.S. Cl. .................................... 428/201; 428/204; 428/207; 428/447; 430/916; 528/27
[58] Field of Search ............... 428/220, 447, 203, 201, 428/204, 207; 528/27; 430/916

[56] References Cited

U.S. PATENT DOCUMENTS

| 4,049,861 | 9/1977 | Nozari | 428/220 |
| 4,069,368 | 1/1978 | Deyak | 428/447 |
| 4,156,046 | 5/1979 | Lien et al. | 428/220 |
| 4,293,606 | 10/1981 | Zollinger et al. | 428/203 |

Primary Examiner—Thomas J. Herbert
Attorney, Agent, or Firm—Donald M. Sell; James A. Smith; Mark A. Litman

[57] ABSTRACT

Abrasion resistant films formed by the copolymerization of epoxy-terminated silanes and limonene monoxide display water repellency that reduces damage to the integrity of the film.

13 Claims, No Drawings

WATER-REPELLENT, ABRASION RESISTANT COATINGS

BACKGROUND OF THE INVENTION

There are many different factors which can limit the durability of articles besides normal wear during use. Color fading, surface abrasion, and soiling, for example, can sufficiently diminish the aesthetics of an article so that it ought to be replaced. Some items such as photographs and works of art cannot be replaced when such damage has been wrought on them. Most organic materials, including dyes and pigment, are susceptible to degradation by light, the ultraviolet region of the electromagnetic spectrum (approximately 290 to 400 nm) being the most damaging radiation. As conventional fluorescent lighting emits some ultraviolet radiation in this region, avoidance of sunlight is not necessarily complete protection from such radiation. In the past, clear films of synthetic polymers containing ultraviolet absorbers have been used to protect certain items, including color photographs, against fading caused by ultraviolet radiation. The addition of such protective coatings, although reasonably effective against fading, have not provided protection against other deleterious effects such as abrasion and soiling. The coatings also must generally be able to provide impact resistance and flexibility, especially on an article such as a painting or color photograph.

U.S. Pat. No. 4,049,861 discloses abrasion resistant coatings based upon the polymerization of epoxy-terminated silanes. A high degree of abrasion resistance is provided by that technology.

U.S. Pat. No. 4,156,046 discloses an abrasion resistant, bloom resistant coating for use on substrates which are susceptible to damage from ultraviolet radiation, abrasion, and/or soiling. The abrasion resistant ultraviolet radiation protective coatings of U.S. Pat. No. 4,156,046 are highly effective, but tend to be subject to surface crazing when contacted with water. It is surprising that such water sensitivity exists in a coating that is resistant even to very strong solvents, and it would be desirable to eliminate the water-sensitivity.

SUMMARY OF THE INVENTION

Abrasion resistant coatings comprising the cured product of more than sixty percent epoxy-terminated silane, 15 to 30% by weight of limonene monoxide, and less than 10% by weight of other copolymerizable epoxide materials display excellent abrasion resistance and reduced water sensitivity. The use of 2 to 20% by weight of ultraviolet radiation (UV) absorbers also provides protection against ultraviolet radiation fading without crystallization of the UV absorbers.

EXPOXY-TERMINATED SILANES

Epoxy-terminated silanes are compounds or materials having polymerizable (preferably terminal) epoxy groups and polymerizable silane groups, the bridging of these groups being through a non-hydrolyzable aliphatic, aromatic, or mixed aliphatic-aromatic divalent hydrocarbon radical which may have N and/or O atoms in the radical chain. It is preferred to have no N atoms and most preferred to have O atoms present only adjacent to the epoxy group. The O atoms, for example, would be within the chain only as ether linkages. These radical chains may be generally substituted as is well known in the art, as substituents on the chain do not greatly affect the functional ability of the epoxy-terminated silanes to undergo the essential reactions necessary for polymerization through the siloxane or epoxy terminal groups. Examples of substituents which may be present on the linkage or bridging moieties are groups such as $NO_2$, alkyl (e.g., $CH_3(CH_2)_nCH_2$), alkoxy (e.g., methoxy), halogen, etc. In structural formulae appearing within this description of the invention, such allowable substitution of the bridging moieties is included unless specifically excluded by language such as "unsubstituted divalent hydrocarbon radical."

Examples of preferred epoxy-terminated silanes useful in the practice of this invention are compounds of the general formulae:

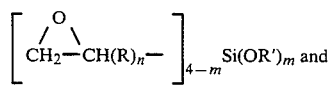 and

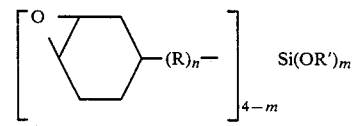

where R is a divalent hydrocarbon radical (aliphatic, aromatic, or mixed aliphatic-aromatic containing) of less than 20 carbon atoms or a divalent radical of less than 20 carbon atoms composed of C, N, S, and O atoms (these atoms are the only atoms which should appear in the backbone of the divalent radicals), any oxygen present being in the form of ether linkages. It is preferred to have no N atoms. No two heteroatoms may be adjacent within the backbone of the divalent hydrocarbon radicals. This description defines divalent hydrocarbon radicals for epoxy terminated siloxanes in the practice of this invention.

A more preferred formula definition of epoxy terminated silanes is

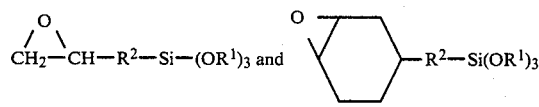

wherein $R^2$ is a non-hydrolyzable divalent hydrocarbon radical of fewer than 20 carbon atoms or a divalent group of fewer than 20 carbon atoms the backbone of which is composed of only C, N, S, and O atoms with no two adjacent heteroatoms, and $R^1$ is an aliphatic hydrocarbon group (e.g., alkyl) or acyl group of fewer than 10 carbon atoms.

The compositions employed in this invention can contain an epoxy silane of the above formula in which n is from 0 to 1, m is 1 to 3, R is any divalent hydrocarbon radical such as methylene, ethylene, decalene, phenylene, cyclohexylene, cyclopentylene, methylcyclohexylene, 2-ethylbutylene, and allene or an ether radical such as $-CH_2-CH_2-O-CH_2-CH_2-$, $-(CH_2CH_2O)_2-CH_2-CH_2-$, $-O-CH_2-CH_2-$, and $-CH_2O-(CH_2)_3-$, R' can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula $(CH_2CH_2O)_kZ$ in which k is an integer of at least 1, and Z is hydrogen.

The most preferred epoxy-terminated silanes are those represented by the formulae:

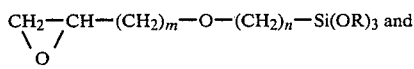

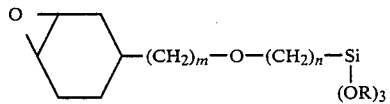

wherein R is an alkyl group of up to 6 carbon atoms, and m and n are independently 1 to 6.

The compositions may additionally contain addenda such as surface active agents, viscosity modifiers, spreading aids, dyestuffs, etc. These may be blended with other epoxy-terminated silanes and comonomers to adjust the physical properties of the final coating. Comonomers are those materials known in the art to be copolymerizable with epoxy groups or silane groups and include epoxies and silanes. Oligomeric, particulate, and polymeric friction reducing agents as taught in U.S. Pat. No. 4,293,606 are preferred. The friction reducing agents of U.S. Pat. No. 4,333,998 have also been found to be particularly useful. These materials and agents generally may constitute up to 5 or 10% by weight of the layer. The friction reducing agents are generally present as 0.05 to 1.5%, preferably less than 1%, by weight of the layer.

CATALYSTS

Catalysts in the present invention are generally used in amounts of from 0.01 to 10% by weight of the reactive ingredients in the curable composition. Preferably from 0.5 to 5% by weight is used, the amount varying with the particular catalyst used. The most preferred catalysts according to the present invention are highly fluorinated aliphatic sulfonylic catalysts and onium catalysts. The related highly fluorinated aliphatic sulfonic catalysts are very useful as are certain Lewis and Bronstad acids, but are less preferred. The sulfonic materials are defined as a highly fluorinated aliphatic sulfonic acid or salt thereof. Fluoroaliphatic sulfonic acids, methanes and imides and their preparation and use are disclosed in U.S. Pat. No. 4,049,861.

Onium catalysts are preferred in the practice of the present invention are aromatic, organic adducts of an aromatic organoatomic cation of a Group Va, VIa, or VIIa atom particularly phosphorous, antimony, sulfur, nitrogen, and iodine atoms, and an anion. Aromatic as used in the description of the groups on the onium catalysts as used in the present invention means an aromatic or heterocyclic ring (phenyl, naphthyl, substituted or unsubstituted 5, 6 or 7-membered heterocycle comprised of only C, N, S, O, and Se atoms with no more than one atom in the ring selected from S, O, or Se atoms) so attached to the nominative atom that it is at least as electron withdrawing as benzene. For example, phenacyl

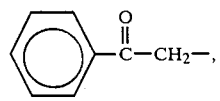

would be a useful aromatic group (being at least as electron withdrawing as benzene), but benzyl

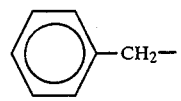

would not be as useful because of instability of the compound which would impair storate stability. Representative aromatic rings are phenyl, naphthyl, thienyl, pyranyl, furanyl and pyrazolyl, substituted or not.

A descriptive formula for the onium catalysts of the present invention would be

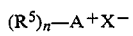

wherein each $R^5$ is independently an aromatic group at least as electron withdrawing as benzene, and $R^5$ groups may be bonded together,
n is a positive whole integer equal to the valence of A plus one,
A is a group Va, VIa, or VIIa atoms, and
X is an anion.

These onium materials are already known in the art. For example, U.S. Pat. Nos. 4,058,400; 4,058,401; 4,135,255; 4,102,687 and 4,026,705 show the use of certain onium compounds as cationic polymerization catalysts for specific monomers.

The presence of catalytic amounts of moisture has been found to be necessary in the initiation of the condensation of silanes with those catalysts. Atmospheric moisture will usually be sufficient, but water may be added to the system if desired or if polymerization is needed in the absence of air for any particular application.

Examples of suitable onium salts include, but are not limited to:
Onium Salts Having a Period Group VIa Cation
  Triphenylsulfonium hexafluoroantimonate
  4-chlorophenyldiphenylsulfonium tetrafluoroborate
  Triphenyl teluronium pentachlorobismutate
  Triphenyl selenonium hexafluoroantimonate
  Diphenyl, p-thiophenyl phenyl sulfonium hexafluoroantimonate Onium Salts Having a Period Group VIIa Cation
  Diphenyliodonium hexafluoroantimonate
  4-Chlorophenylphenyliodonium hexafluorophosphate
  4-Trifluoromethylphenylphenyliodonium tetrafluoroborate
  4-methylphenylphenyliodonium tetrafluoroborate
  2,2'-Diphenyliodonium hexafluorophosphate The compositions of the invention can be prepared by mixing the onium salt with the epoxy-terminated silane composition until a solution is formed. Because many of the onium salts have limited solubility in the silicon-containing compound, it is often preferable to first dissolve the onium salt in a liquid diluent that is inert to the components of the composition and then mix this solution into the reactive composition. Suitable inert diluents include alcohols such as ethanol, esters such as ethyl acetate, ethers such as diethyl ether, halohydrocarbons such as dichloroethane, and nitriles such as acetonitrile. For storage stability, these solvents and the solutions must be anhydrous.

The aromatic iodonium salts are of the formulae:

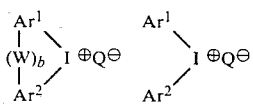

wherein Ar[1] and Ar[2] are aromatic groups having 4 to 20 carbon atoms and are selected from phenyl, naphthyl, thienyl, furanyl and pyrazolyl groups; W is selected from
O, S, S=O, C=O, O=S=O, R[11]—N
where R[11] is aryl of 6 to 20 carbon atoms or acyl of 2 to 20 carbon atoms (such as phenyl, acyl, benzoyl, etc.); a carbon-to-carbon bond; or R[12]—C—R[13], where R[12] and R[13] are selected from hydrogen, alkyl groups of 1 to 4 carbon atoms, and alkenyl groups of 2 to 4 carbon atoms; and b is zero or 1; and Q is a halogen-containing complex anion selected from tetrafluoroborate, hexafluorophosphate, hexafluoroarsenate, hexachloroantimonate and hexafluoroantimonate; a fluoroaliphatic sulfonic acid; a bis-(fluoroaliphaticsulfonyl)methane; or a bis(fluoroaliphaticsulfonyl)imide.

Preferred compounds from this group include those where n=0. Further preferred materials have Ar[1] and Ar[2] as a phenyl group.

The aromatic sulfonium salts are of the formulae:

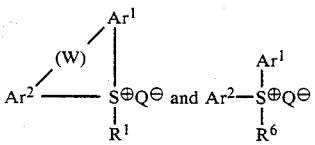

wherein Ar[1] and Ar[2] can be the same or different, selected from aromatic (as defined above for aromatic iodonium salts) and R[6], W and Q are the same as defined before. Preferred compounds of this class are those in which Ar[2] and R[1] are phenyl.

Suitable examples of the preferred aromatic onium salt photocatalysts include:
diphenyliodonium tetrafluoroborate
diphenyliodonium hexafluorophosphate
diphenyliodonium hexafluoroarsenate
diphenyliodonium hexachloroantimonate
diphenyliodonium hexafluoroantimonate
diphenyliodonium bis(trifluoromethylsulfonyl)methane The aromatic onium salt photocatalysts useful in the photopolymerizable compositions of the invention are of themselves photosensitive only in the ultraviolet. They are latent catalysts which must be mixed with the reactants then activated by irradiation. They can be further sensitized to the near ultraviolet and the visible range of the spectrum by sensitizers for known photolyzable iodonium compounds in accordance with the teachings of U.S. Pat. No. 3,729,313.

Limonene monoxide has the structural formula:

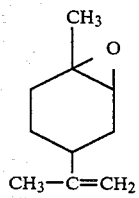

and has been found to be unique in the practice of the present invention. Even when related compounds such as cyclohexene oxide, α-pinene oxide or limonene dioxide are used in place of the limonene monoxide, the water resistivity is not nearly as great. These compounds may be present as materials copolymerizable with epoxy groups, but will not replace the required 15 to 30% by weight of limonene monoxide used in the practice of the present invention.

COPOLYMERIZABLE EPOXY COMPOUND

Copolymerizable epoxy compounds according to the present invention have the formula:

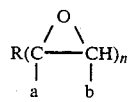

wherein R is an aliphatic or cycloaliphatic radical such that the epoxy compound has a molecular weight of at least 100 per epoxy group to prevent bloom. It is more preferred to be a compound having a molecular weight of at least 150 per epoxy group to add significant flexibility improvement. Aliphatic and cycloaliphatic refer to hydrocarbons which also may have ether and ester oxygens and thio ether groups therein. n is the valence of R and is an integer of 1 to 6 (preferably a and b are H or, when fused together, the atoms necessary to form a 5- or 6-member cycloaliphatic ring. R is preferably selected so that the epoxy compound, upon homopolymerization provides a polymer having a glass transition temperature ($T_g$) below $-25°$ C.

Useful polyepoxides which are also flexibilizing epoxies further include those which contain one or more cyclohexene oxide groups such as the epoxycyclohexanecarboxylates, typified by 3,4-epoxycyclohexylmethyl, 2,4-epoxycyclohexanecarboxylate, 3,4-epoxy-2-methylcyclohexylmethyl, 3,4-epoxy-2-methylcyclohexanecarboxylate, and bis(3,4-epoxy-6-methylcyclohexylmethyl)adipate.

Other useful flexibilizing epoxy compounds include polyglycidal ethers of aliphatic polyols such as 1,6-hexanediol diglycidyl ether, diethyleneglycol diglycidyl ether, triethyleneglycol diglycidyl ether, polypropyleneglycol diglycidyl ether, diglycidyl ether of 2,5-dioxanediol, and the triglycidyl ether of trimethylolpropane; epoxidized polyolefins such as dipentane dioxide, and epoxidized polybutadiene. Other useful aliphatic polyepoxy compounds are disclosed in "Handbook of Epoxy Resins", McGraw-Hill Brook Co. (1967). These compounds are optional and used in amounts of less than 10% by weight, preferably less than 5% by weight, and most preferably less than 1% or none to improve water-resistance.

ULTRAVIOLET ABSORBERS

Ultraviolet absorbers within the preferred practice of this invention fall into the following classes:
BENZOPHENONES: This class comprises substituted 2-hydroxybenzophenones. They are available with a variety of substituents on the basic molecule to provide proper compatibility, non-volatility, and particular absorption properties. Typical substituted 2-hydroxybenzophenones are 2-hydroxy-4-methoxy-benzophenone, 2-hydroxy-4octyloxybenzophenone, 4-dodecycloxy-2-hydroxybenzophenone, and 2,2'-dihydroxy-4,4'-dimethoxybenzophenone. The art recognizes substituted 2-hydroxybenzophenones as a class.

BENZOTRIAZOLES: This class comprises derivatives of 2-(2'-hydroxyphenyl)benzotriazole. Typical examples are 2-(2'-hydroxy-5'-methylphenyl)benzotriazole and 2-(2'-hydroxy5'-t-octylphenyl)benzotriazole. Substituted 2-(2'hydroxyphenyl)benzotriazoles are also an art recognized class of ultraviolet radiation absorbers.

SUBSTITUTED ACRYLATES: These are another art recognized class of UV absorbers. Typical examples are ethyl-2-cyano-3,3diphenyl acrylate, and p-methoxybenzylidene malonic acid dimethyl ester.

ARYL ESTERS: This art recognized class includes aryl salicylates, benzoates, and esters of resorcinol. Typical examples are phenyl salicylate, p-t-octylphenyl salicylate, resorcinol monobenzoate, and 2,4-di-t-butyl-phenyl-3,5-di-t-butyl-4hydroxybenzoate.

Combinations of these UV absorbers are often used to aggregate the properties of the individual absorbers. Preferred absorbers are (I) 2,4-dihydroxybenzophenone, (II) 2,2'4,4'-tetrahydroxybenzophenone, (III) 2-(2'-hydroxy-5methylphenyl)benzotriazole and (IV) 2-(3',5'-di-t-amyl-2'hydroxyphenyl)benzothiazole.

The ultraviolet radiation absorbing materials are generally used in an amount between 2 and 20% by weight of the abrasion resistant layer. Preferably between 3 and 10% by weight is used, and more preferably between 4 and 8% by weight is used. The large amounts of absorbers capable of being dissolved in the layer are quite surprising, particularly in the absence of flexibilizing epoxies as described in U.S. Pat. No. 4,156,046. Using larger amounts of UV absorbers increases the ultraviolet radiation protection afforded by the film.

Reference to the following examples will provide further understanding of the present invention.

EXAMPLES 1-2

Two solutions were prepared with the following approximate proportions:

| Material | Solution A (g) | Solution B (g) |
| --- | --- | --- |
| γ-glycidoxypropyltrimethoxy silane | 70 | 45 |
| limonene monoxide | 20 | 0 |
| 1,4-butanediol diglycidyl ether | 0 | 36 |
| 2,4-dihydroxybenzophenone | 5 | 5 |
| triphenylsulfonium hexafluoroantimonate | 5 | 5 |
| inert fluorocarbon coating aid | <0.2 | <0.2 |

Both compositions were coated onto glossy photographic color prints at a thickness of approximately 2.5 microns and irradiated with ultraviolet light until cured. Both solutions produced high gloss coatings which displayed excellent abrasion resistance, resistance to organic solvents, and protection of the photographic dyes against ultraviolet fading. Water was applied in droplet form onto both surfaces resting in a horizontal position; after standing in contact with the coated photographs for three minutes, the water droplets were gently blotted away with absorbent tissue. Permanent, visible spots appeared on the surface of the photograph coated with Solution B, but no spots remained on the surface of the photograph coated with Solution A.

EXAMPLES 3-5

Similarly, Solutions C, D, and E were prepared, coated, cured and tested in the same manner described above.

| | C (g) | D (g) | E (g) |
| --- | --- | --- | --- |
| γ-glycidoxypropytrimethoxysilane | 70 | 70 | 70 |
| cyclohexene oxide | 20 | — | — |
| α-pinene oxide | — | 20 | — |
| limonene dioxide | — | — | 20 |
| 2,4-dihydroxybenzophenone | 5 | 5 | 5 |
| triphenysulfonium hexafluoroantimonate | 5 | 5 | 5 |
| inert fluorocarbon surfactant | 0.1 | 0.1 | 0.1 |

In all three cases, permanent water spotting occured on coated photographs after three minutes of contact with the water droplets. Microscopic examination of these "water spots" revealed a multitude of tiny fractures in the coating where contact had been made with water. These marks were permanent in nature and remained even after several days of air drying. The uniqueness of limonene monoxide is shown by these examples.

EXAMPLE 6

Two coating solutions were prepared similar to those of Examples 1 and 2, except that a different class of U.V. absorber was employed. The solutions of Examples 1 and 2 contained a benzophenone derivative; the solutions of the present example employ Tinuvin ®328 (Ciba-Geigy), which is a benzotriazole derivative.

| | A' (g) | B' (g) |
| --- | --- | --- |
| γ-glycidoxypropyltrimethoxysilane | 70.6 | 54.3 |
| butane diol, diglycidyl ether | — | 36.3 |
| limonene monoxide | 19.6 | — |
| triarylsulfonium hexafluoroantimonate | 4.2 | 4.0 |
| Tinuvin 328 | 5.0 | 5.0 |
| FC-430 | 0.2 | 0.2 |
| L-722 Silicone | 0.4 | 0.2 |
| | 100.0 g | 100.0 g |

The above solutions were coated on processed, glossy color photographic prints using a No. 3 RDS coating bar. The coated photographs were irradiated under a medium pressure ultraviolet lamp (200 watts/inch) at a distance of nine inches for about 20 seconds to effect cure. Inspection of the coated photographs after allowing them to age overnight revealed that the photograph coated with Solution B' exhibited an abundance of "absorber bloom", a white dusty film irregularly deposited on the coated surface, while the photograph coated with Solution A' maintained a clear, glossy surface.

I claim:
1. A developed photographic image having adhered to the outer surface thereof an abrasion-resistant, water-repellent layer comprising the reaction product of:
  (1) more than 60% by weight of an epoxy-terminated silane,
  (2) 15 to 30% by weight of limonene monoxide, and
  (3) less than 10% by weight of a material copolymerizable with epoxy groups, other than limonene monoxide.
2. The developed photographic image of claim 1 wherein less than 1% by weight of material copolymer- izable with epoxy groups other than limonene monoxide is present in said film.

3. The developed photographic image of claim 1 wherein 2 to 20% by weight of an ultraviolet radiation absorber is present.

4. The developed photographic image of claim 3 wherein said ultraviolet radiation absorber is selected from the group consisting of benzophenones and benzotriazoles.

5. The developed photographic image of claim 1 wherein said epoxy-terminated silane has the formula

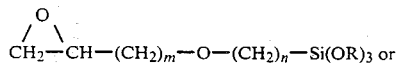

or

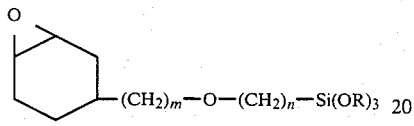

wherein R is an alkyl of 1 to 6 carbon atoms and m and n are independently 1 to 6.

6. The developed photographic image of claim 5 wherein 0.05 to 1.5% by weight of a friction reducing agent is present in said film.

7. The developed photographic image of claim 5 wherein less than 1% by weight of material copolymerizable with epoxy groups other than limonene monoxide is present in said film.

8. The developed photographic image of claim 5 wherein 3 to 10% by weight of an ultraviolet radiation absorber is present.

9. The developed photographic image of claim 8 wherein 0.05 to 1.5% by weight of a friction reducing agent is present in said film.

10. The developed photographic image of clam 5 wherein said ultraviolet radiation absorber is selected from the group consisting of benzophenones and benzotriazoles.

11. The developed photographic image of claim 10 wherein 0.05 to 1.5% by weight of a friction reducing agent is present in said film.

12. The developed photographic image of claim 10 wherein less than 1% by weight of material copolymerizable with epoxy groups other than limonene monoxide is present in said film.

13. A polymerizable liquid composition comprising at least 60% by weight of an epoxy-terminated silane, 15 to 30% by weight of limonene monoxide, less than 10% by weight of materials copolymerizable with epoxy groups other than limonene monoxide, 1 to 10% by weight of a latent catalyst capable of curing both epoxy and silane groups, and 2 to 20% by weight of an ultraviolet radiation absorbing material.

* * * * *